May 21, 1946.　　　　A. O. TESCH　　　　2,400,664
FUEL SYSTEM FOR INTERNAL-COMBUSTION ENGINES
Filed March 8, 1944　　　3 Sheets-Sheet 1
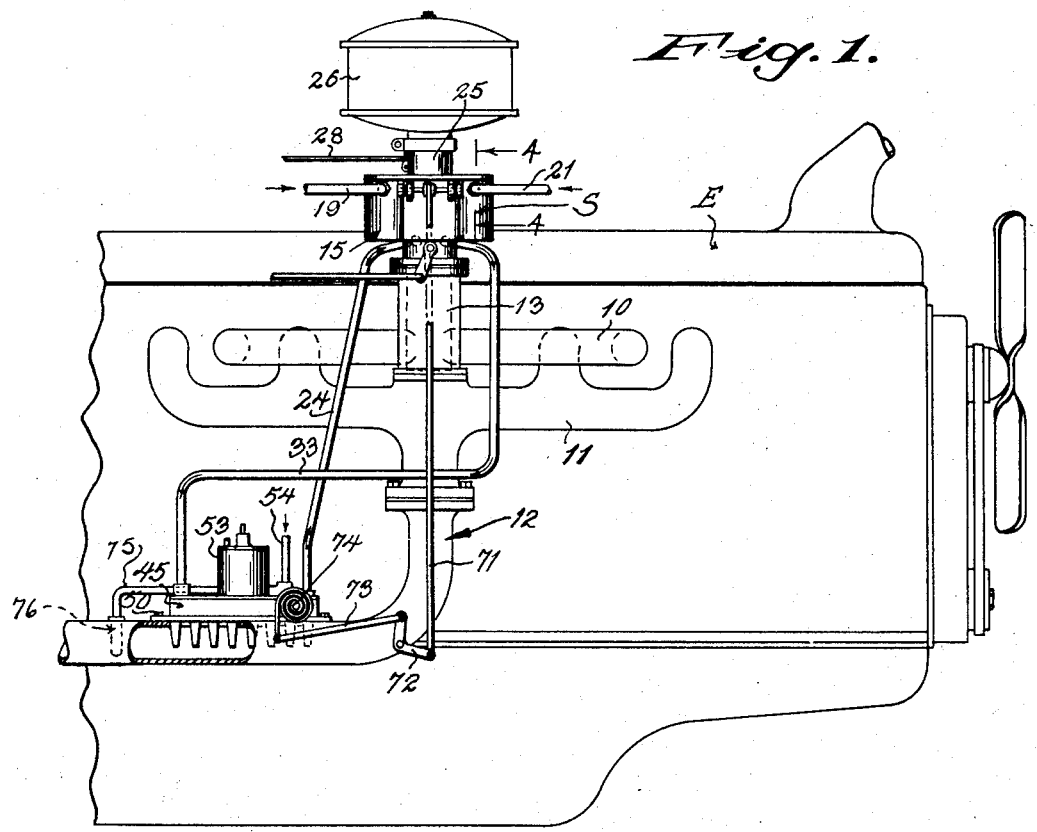
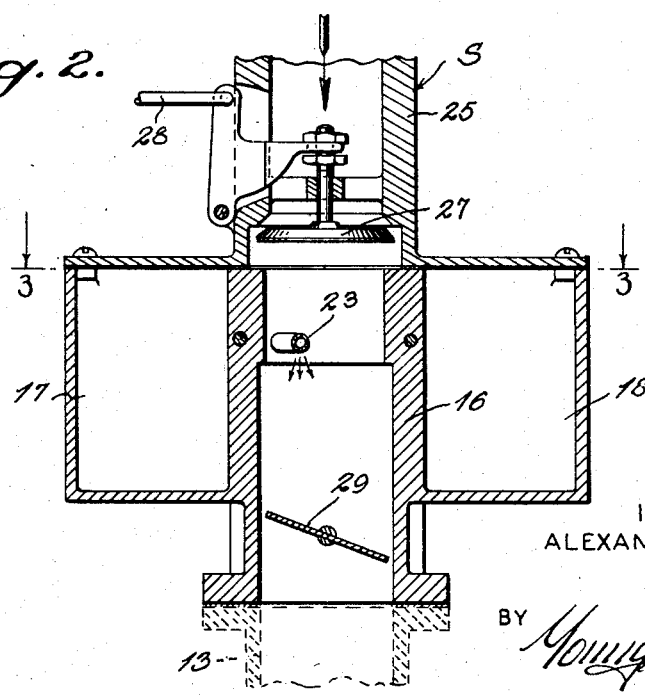
INVENTOR
ALEXANDER O. TESCH
BY *Young and Wright*
ATTORNEYS May 21, 1946.  A. O. TESCH  2,400,664
FUEL SYSTEM FOR INTERNAL-COMBUSTION ENGINES
Filed March 8, 1944  3 Sheets-Sheet 2
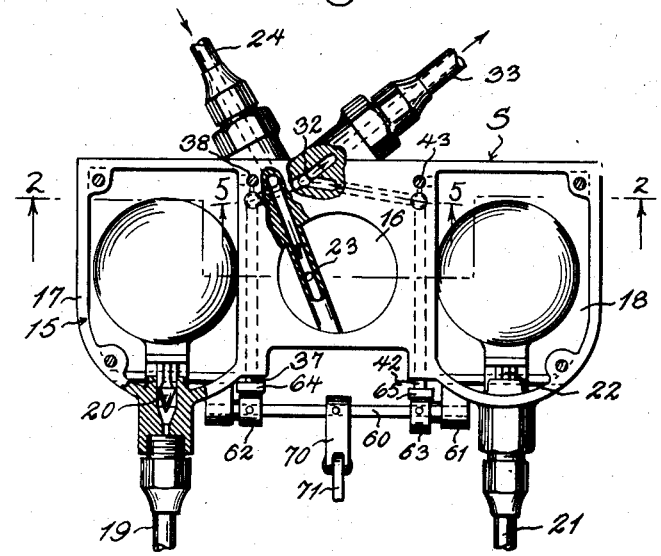
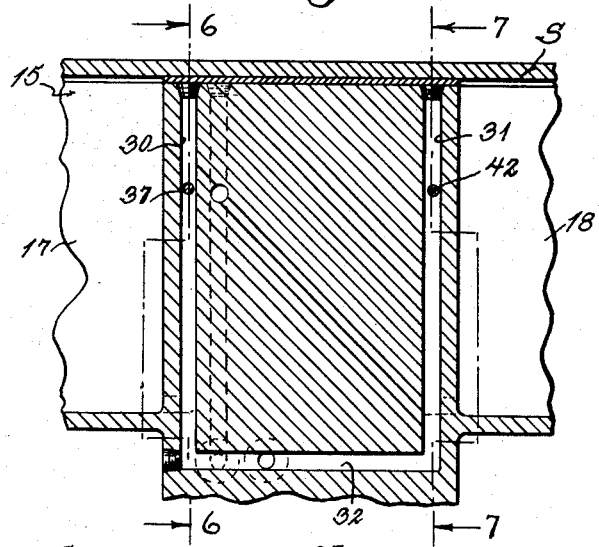
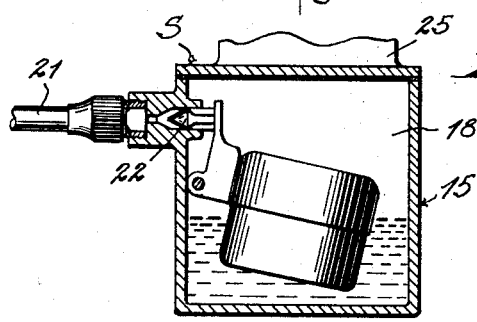
INVENTOR
ALEXANDER O. TESCH
BY
ATTORNEYS May 21, 1946.    A. O. TESCH    2,400,664
FUEL SYSTEM FOR INTERNAL-COMBUSTION ENGINES
Filed March 8, 1944    3 Sheets-Sheet 3
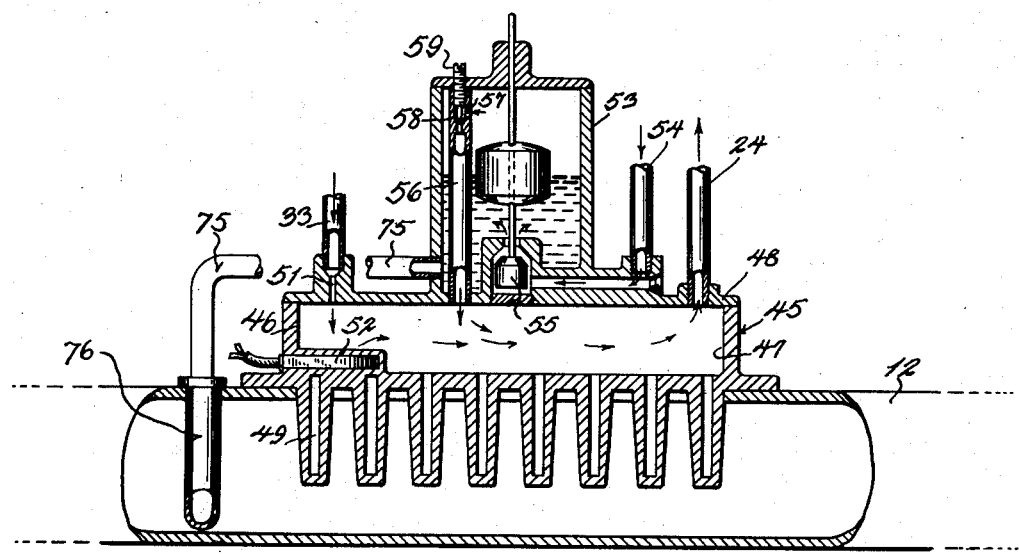
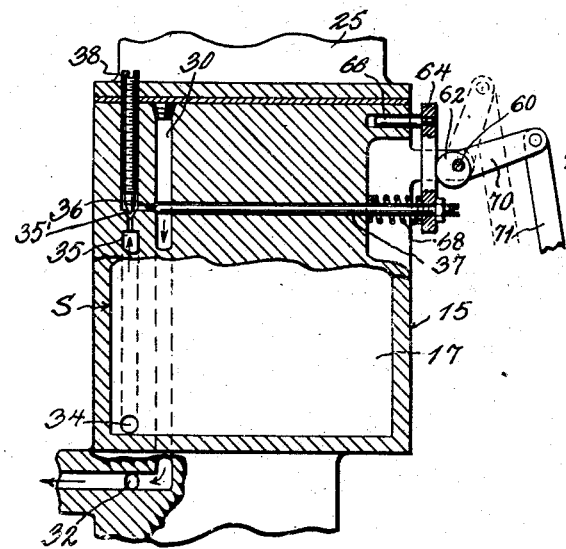 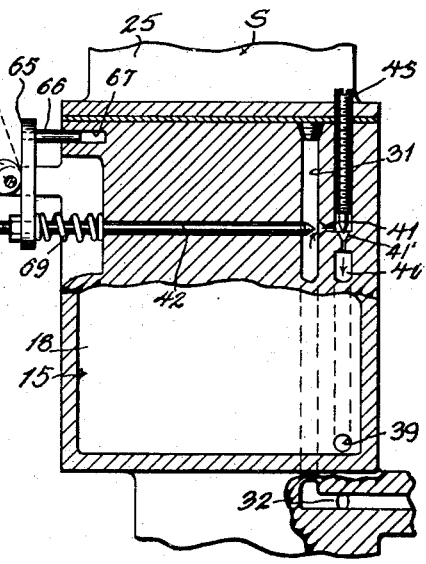
INVENTOR
ALEXANDER O. TESCH
BY
ATTORNEYS Patented May 21, 1946

2,400,664

UNITED STATES PATENT OFFICE 2,400,664

FUEL SYSTEM FOR INTERNAL-COMBUSTION ENGINES

Alexander O. Tesch, Milwaukee, Wis.

Application March 8, 1944, Serial No. 525,616

3 Claims. (Cl. 123—25)

This invention appertains to internal combustion engines and more particularly to a novel fuel system therefor.

One of the primary objects of my invention is to provide a novel fuel system for internal combustion engines embodying a carburetor having a double bowl, one of which is adapted to receive gasoline for starting the engine and the other a heavier fuel such as fuel oil, for running the engine after the warming up thereof.

Another salient object of my invention is the provision of a novel heater for receiving the liquid fuel from the bowls for vaporizing the same, with novel means for leading the vaporized charge to the central passage of the carburetor.

A further object of my invention is to provide automatic means for controlling the flow of the gasoline to the heater according to the temperature of the engine, whereby the engine can be started on gasoline and thereafter automatically shifted to fuel oil upon the warming up of the engine.

A further important object of my invention is the provision of incorporating a water chamber directly with the heater and for drawing water vapors from the chamber into the heater for commingling with the fuel vapors, so that a mixed charge of fuel and water vapors will be delivered through the jets of the carburetor to the mixing chamber thereof.

A still further object of my invention is to provide an electrical heating device in the heater or stove and in the path of the entrance of the liquid fuel into said stove whereby such liquid fuel will be vaporized by the electrical heater before the temperature of the stove is raised from the exhaust pipe of the engine.

A still further important object of my invention is to provide a novel fuel system for internal combustion engines for permitting the economical use of fuel oil or other heavy hydrocarbons as the running fuel for the engine, the system embodying a minimum number of operating parts so that a durable and compact structure will be had.

With these and other objects in view, the invention consists in the novel construction, arrangement and formation of parts, as will be hereinafter more specifically described, claimed and illustrated in the accompanying drawings, in which drawings:

Figure 1 is a fragmentary, side elevational view of an internal combustion engine showing my novel fuel system incorporated therewith, parts of the view being shown broken away and in section.

Figure 2 is a vertical, sectional view through the carburetor forming a part of my fuel system, the section being taken on the line 2—2 of Figure 3 looking in the direction of the arrows.

Figure 3 is a horizontal, sectional view taken on the line 3—3 of Figure 2 looking in the direction of the arrows.

Figure 4 is a detail, vertical, sectional view taken through one of the bowls of the carburetor, the section being taken substantially on the line 4—4 of Figure 1 looking in the direction of the arrows.

Figure 5 is an enlarged, detail, vertical, sectional view through the carburetor taken on the line 5—5 of Figure 3 looking in the direction of the arrows illustrating the passage-ways in the carburetor for the fuel.

Figure 6 is an enlarged, detail, vertical, sectional view through the carburetor taken on the line 6—6 of Figure 5 looking in the direction of the arrows illustrating the automatic means for controlling the flow of one of the liquid fuels, say the gasoline, to the heater or stove.

Figure 7 is a view similar to Figure 6 but taken on the line 7—7 of Figure 5 looking in the direction of the arrows and illustrating the automatic means for controlling the flow of the fuel oil to the heater or stove.

Figure 8 is an enlarged, longitudinal, sectional view through the heater or vaporizer.

Referring to the drawings in detail wherein similar reference characters designate corresponding parts throughout the several views, the letter S generally indicates my novel fuel system for an internal combustion engine E. The engine E can be of the type now found in the open market and customarily used as the power plant for automotive vehicles. Hence, the engine will not be described in detail, but the same includes the usual intake manifold 10 and exhaust manifold 11. Communicating with the exhaust manifold is the exhaust pipe 12. Leading to the intake manifold 10 is the fuel charge intake pipe 13.

My novel fuel system S includes a carburetor 15 and a vaporizer or stove 45.

The carburetor 15 includes a central mixing chamber 16 having formed on the opposite sides thereof bowls 17 and 18 for the liquid fuel. In the present instance, the bowl 17 is utilized for fuel oil, such as kerosene and the bowl 18 is utilized for gasoline. Leading into the bowl 17 is a fuel oil supply pipe 19 and the height of the fuel oil within the bowl is controlled by a float operated valve 20. The pipe 19 can lead from a suitable source of fuel oil supply such as a storage tank (not shown).

The bowl 18 has communicating therewith a gasoline supply pipe 21 and the height of the gasoline within the bowl is controlled by a float actuated valve 22. The pipe 21 leads from a suitable gasoline storage tank (not shown).

The mixing chamber 16 of the carburetor has extending into the same the fuel charge nozzle 23 and this nozzle communicates with a conduit pipe 24 which leads from the heater 45 as will be later described.

Communicating with the passage-way 16 is the air conducting pipe 25 which leads from the air conduit cleaner 26. This pipe 25 has arranged therein a choke valve 27. The valve 27 can be operated through the medium of a rod 28. Obviously, the valve 27 can be moved toward and away from its seat according to whether a lean or rich charge is desired.

The outlet of the mixing chamber 16 communicates with the intake pipe 13 of the intake manifold 10 and the mixing chamber between the nozzle 23 and the intake pipe 13 is provided with the usual butterfly throttle valve 29.

Formed in the carburetor body are vertical passage-ways 30 and 31 and the lower ends of these passage-ways are connected by a horizontal passage-way 32. Communicating with the passage-way 32 is a tube 33 which leads to the vaporizer or heater 45, as will also be hereinafter more specifically described.

The lower end of the fuel bowl 17 has communicating therewith a port 34 and this port connects the bowl 17 with a vertical passage-way 35. The upper end of the passage-way 35 has communication with the passage-way 30 by means of an orifice 36. This orifice is automatically controlled by a needle valve 37 which is opened and closed by means which will also be later described. Hence, the needle valve 37 controls the supply of fuel oil to the passage-way 30 and consequently to the pipe 33.

The passageway 35, just below the orifice 36, is provided with a metering orifice 35'. A manually adjustable needle valve 38 is provided for controlling the flow of fuel oil through this metering orifice 35'. Below the orifice 41, the passage-way 31 is provided with a metering orifice 41'. The amount of gasoline flowing through the metering orifice 41' is controlled by a manually adjustable needle valve 43.

The bowl 18 for the gasoline also has communicated with its lower end a port 39 and this port connects with a vertical passage-way 40 and this passage-way in turn has communication with the passage-way 31 through an orifice 41. The orifice is opened and closed by a needle valve 42. The needle valve 42 is automatically controlled by means which will be later described. It is to be noted, however, that the needle valves 37 and 42 are slidably mounted in the carburetor and both extend out through the same side of the carburetor. Below the orifice 41 the passage-way 31 is provided with a metering orifice 41'. The amount of gasoline flowing through the metering orifice 41' is controlled by a manually operable needle valve 43.

From the description so far, it can be seen that the flow of gasoline from the bowl 18 to the passage-way 31 is controlled by the needle valve 42. Thus, this needle valve 42 controls the flow of gasoline to the horizontal passage-way 32 and to the tube 33 which leads to the vaporizer or heater.

The vaporizer or stove 45 includes a casing 46 having a vaporizing chamber 47. The upper end of the chamber is closed by a cover plate 48 and the lower wall of the chamber has formed thereon depending nipples 49. The vaporizer or stove 45 is set into the exhaust pipe 12 and the exhaust pipe is cut away to receive a part of the stove. Suitable bolts, or the like, 50 can be utilized for holding the heater or stove in place and by referring to Figures 1 and 8, it can be seen that the nipples 49 extend into the exhaust pipe so that the same will be efficiently heated by the exhaust gases.

The supply fuel pipe 33 from the carburetor is connected to the cover 48 of the vaporizer or stove 45 and the cover is provided with a suitable bore 51 to permit the flow of the fuel from the pipe into the stove. The stove or vaporizer can have incorporated therewith an electric heater 52 which is disposed directly below the bore 51 and consequently the fuel flowing into the vaporizer or stove will be instantly heated or vaporized by this electric heater. The electric heater 52 can be utilized when the engine is being initially started in cold weather so as to insure the proper vaporizing of fuel. The storage battery of the automobile can be utilized as the source of energy for the electric heater and the circuit to the heater can be opened and closed by a switch (not shown).

The cover 48 for the heater or stove 45 has extending into the same the conduit or pipe 24 which leads to the fuel nozzle 23 of the carburetor. Hence, the vapors from the heater or stove 45 are delivered by this pipe to the mixing chamber of the carburetor.

The heater or stove 45 has formed on the cover thereof a water compartment 53 and water is delivered to this compartment through a conduit pipe 54. This pipe can lead from any suitable source of water supply, such as a water tank. The height of the water in the compartment is controlled by a float valve 55. As the compartment 53 is formed directly on the cover of the heater, the water will be heated and the vapors arising from the water are sucked into the vaporizer or stove proper through a tube 56. This tube communicates with the interior of the vaporizer or stove and the tube above the water level of the compartment is provided with an inlet 57 for the water vapors. A valve seat 58 is provided in the tube below the inlet 57 and a manually adjustable needle valve 59 is provided for said seat whereby the amount of water vapors delivered to the vaporizer or stove can be controlled.

Hence, it can be seen that means are provided for delivering water vapors to the fuel vapors.

As heretofore stated, this charge is delivered through the nozzle 23 to the mixing chamber 16 of the carburetor and consequently, the commingled fuel vapors and water vapors are thoroughly mixed with the air flowing through the chamber 16. Naturally, the suction of the engine will draw in the air and create a suction on the nozzle 23 to draw in the necessary charge.

As previously mentioned, the needle valves 37 and 42 are automatically controlled, so that the delivery of either fuel oil or gasoline to the vaporizer or stove 45 will be automatically regulated according to the temperature of the engine.

The means for operating the needle valves 37 and 42 includes a rock-shaft 60 which is rotatably mounted in suitable bearing 61 carried by the carburetor. The rock-shaft 60 has secured thereto cams 62 and 63. These cams engage respectively push plates 64 and 65. The push plates, in turn, are secured respectively to the needle valves 37 and 42. As illustrated, the needle valves are threaded into the push plates and the push plates are held in a set position by lock nuts. Guide stems 66 can be provided for the push plates and these stems are slidably mounted in guide opening 67 formed in the carburetor. Coil springs 68 and 69 are placed about the needle valves 37 and 42 and are confined respectively between the push plates 64 and 65 and the carburetor. Consequently, these springs function to normally move the needle valves away from their seats. The cams 62 and 63 are so disposed on the rock-shaft 60 that when one cam pushes on its push plate to close its valve, the other cam will be moved away from its push plate to allow the opening of the needle valve carried thereby.

In order to rock the shaft 60, the same is provided with a crank 70 and pivotally connected to the crank is an operating rod 71. This rod 71 is, in turn, pivotally connected to one arm of a bell crank 72. This bell crank is rockably mounted at its angle on a suitable part of the engine. The other arm of the bell crank has pivotally connected therewith an operating rod 73 and this rod is operatively connected to a thermostat 74. The thermostat can be of any approved type and is fastened to the vaporizer or stove 45 and consequently the thermostat will be subjected to the heat radiating from the vaporizer.

In operation of my invention, considering that the engine is to be initially started and is cold, then the parts of the carburetor will be positioned as shown in Figures 3, 6 and 7. Consequently, the needle valve 37 will be in its closed position for shutting off the flow of fuel oil from the bowl 17 to the vaporizer, and the valve 42 will be opened to permit the flow of gasoline to the vaporizer. As the engine is cranked by its starter, a suction will be created in the mixing chamber 16 through the nozzle, vaporizer and bowl 18 and consequently gasoline will be delivered to the mixing chamber. If desired, the electric heater 52 can be brought into use for vaporizing the gasoline. As the engine and vaporizer 45 become heated, the thermostat 74 will expand and automatically rock the shaft 60 and move the cams 62 and 63 to the dotted line position shown in Figures 6 and 7. Consequently, the needle valve 42 will be moved on its seat shutting off the flow of gasoline and simultaneously therewith the cam 62 will move away from its push plate 64 and the needle valve 37 will be moved away from its seat by the spring 68 allowing the flow of fuel oil to the vaporizer 45 and to the engine.

From the foregoing description, it can be seen that I have provided an exceptionally simple fuel system for internal combustion engines which will permit the efficient use of fuel oil, kerosene, or the like, for the normal running of the engine.

In order to supply an adequate amount of water vapors or steam to the fuel charge, I can provide an additional means for heating the water in the water compartment 53. This means can consist of a tube 75, which leads to the bottom of said water compartment. The tube is connected with a hot water bulb 76 which is positioned directly within the exhaust manifold 12. Obviously, water flowing into said bulb will be quickly heated by the exhaust vapors after the starting of the engine.

Changes in details may be made without departing from the spirit or the scope of my invention, but what I claim as new is:

1. In a fuel system for internal combustion engines, a carburetor having a mixing chamber provided with an air inlet and a fuel charge outlet, a fuel nozzle extending into the chamber, independent fuel bowls for the carburetor, one of said bowls receiving one type of liquid fuel and the other said bowl receiving a different type of liquid fuel, a vaporizer stove, means connecting the vaporizer stove with the nozzle, said carburetor having a fuel passage-way, means connecting the fuel passage-way with the vaporizer stove, separate valves for controlling the flow of the liquid fuels from the bowls to the passage-way, means for opening and closing said valves according to the temperature of the engine, and said vaporizer stove having a water compartment, means connecting the upper end of said compartment with the vaporizer stove.

2. In a fuel system for internal combustion engines, a carburetor including a mixing chamber having an air inlet and a fuel charge outlet and a pair of independent fuel receiving bowls, means for supplying one type of liquid fuel to one bowl and means for supplying another type of liquid fuel to the other bowl, a vaporizer stove adapted to be heated from the engine including a vaporizing chamber, means connecting the vaporizing chamber with the fuel nozzle, said carburetor having a fuel passage-way, a valve for controlling the flow of fuel from one bowl to the passage-way, second valve for controlling the flow of fuel from the other bowl to the passage-way, means connecting the passage-way with the vaporizing chamber, a rock-shaft having cams for operating said valves, the shaft in one position permitting the opening of one valve and the closing of the other, and when in another position, permitting the closing of the first valve and the opening of the second valve, means for automaticaly operating the rock-shaft according to the temperature of the engine, said last named means including a thermostat positioned in close proximity to the vaporizer stove, said vaporizer stove having a water compartment adapted to be heated therefrom, a float valve for controlling the flow of water to said compartment and means conecting the upper end of the compartment to the vaporizing chamber.

3. In a fuel system for internal combustion engines, a carburetor including a mixing chamber having an air inlet and a fuel charge outlet and a pair of independent fuel receiving bowls, means for supplying one type of liquid fuel to one bowl and means for supplying another type of liquid fuel to the other bowl, a vaporizer stove adapted to be heated from the engine including a vaporizing chamber, means connecting the vaporizing chamber with the fuel nozzle, said carburetor having a fuel passage-way, a valve for controlling the flow of fuel from one bowl to the passage-way, second valve for controlling the flow of fuel from the other bowl to the passage-way, means connecting the passage-way with the vaporizing chamber, a rock-shaft having cams for operating said valves, the shaft in one position permitting the opening of one valve and the closing of the other, and when in another position, permitting the closing of the first valve and the opening of the second valve, means for automatically operating the rock-shaft according to the temperature of the engine, said last named means including a thermostat positioned in close proximity to the vaporizer stove, and means for supplying water vapor to the vaporizing chamber.

ALEXANDER O. TESCH.